US005715418A

United States Patent [19]
Atsatt et al.

[11] Patent Number: 5,715,418
[45] Date of Patent: Feb. 3, 1998

[54] AUTONOMOUS HIGH SPEED LINEAR SPACE ADDRESS MODE TRANSLATION FOR USE WITH A COMPUTER HARD DISC SYSTEM

[75] Inventors: Sean R. Atsatt, Santa Cruz; John Chester Masiewicz, San Jose; Pervez E. Virjee, Santa Cruz; Marvin Mang-Yin Lum, San Jose, all of Calif.

[73] Assignee: Seagate Technologies, Inc., Scotts Valley, Calif.

[21] Appl. No.: 281,445

[22] Filed: Jul. 27, 1994

[51] Int. Cl.[6] .................. G06F 9/26; G06F 12/00; G06F 12/10

[52] U.S. Cl. .......... 395/412; 395/413; 395/416; 395/404; 395/419

[58] Field of Search ................. 395/412, 413, 395/404, 416, 419, 182.05, 440, 441; 369/32

[56] References Cited

U.S. PATENT DOCUMENTS

| | | | |
|---|---|---|---|
| 5,367,669 | 11/1994 | Holland et al. | 395/182.05 |
| 5,386,402 | 1/1995 | Akitoshi | 369/32 |
| 5,420,998 | 5/1995 | Randall | 395/440 |
| 5,463,765 | 10/1995 | Kakuta et al. | 395/441 |

*Primary Examiner*—David K. Moore
*Assistant Examiner*—T. Nguyen
*Attorney, Agent, or Firm*—Flehr Hohbach Test Albritton & Herbert LLP

[57] ABSTRACT

Translating between physical and logical (or virtual) address spaces occurs autonomously using information decoded by an address mode translator from command bits within a host CPU issued command. The translator communicates with a hard disc controller unit local microprocessor or microcontroller and controller unit task registers. A host CPU issued command interrupts the local microprocessor and activates the address mode translator by writing to an appropriate controller unit task register using indirect addressing. The address mode translator preferably provides four algorithms, with algorithm selection occurring autonomously according to the decoded command bits. The algorithms provide physical block address to physical CHS cylinder-head-sector conversion, logical CHS to logical block address conversion, and also provide divide and multiply functions, useful for disc caching. Upon completion of the conversion or other function procedure, the address translator signals that the processed result is ready for reading by the controller unit local microprocessor or microcontroller. The translator may be implemented as a microprogrammed sequencer with an instruction set tailored to perform linear address translations and stored in memory associated with the local microprocessor. Alternatively, the instruction set may be downloaded by the microprocessor from disc drive software. The address translator provides the microprocessor with a translated address in a usable form more rapidly than if the local microprocessor had made the translation.

14 Claims, 3 Drawing Sheets ern hard disc drives have command overhead times on the order of 1 ms or less, and often incorporate disc caching. As a result, the 0.3 ms address conversion time is no longer a negligible delay component. As used herein, the term "command overhead time" refers to the delay within a disc controller between receipt of the last word of a command, typically writing of the command register, and the time of actual execution of the desired command, at which time the host CPU recognizes the response to its issued command. Understandably, providing a more powerful local microprocessor could be useful in reducing command overhead time, but economic considerations have generally precluded such a solution.

AUTONOMOUS HIGH SPEED LINEAR SPACE ADDRESS MODE TRANSLATION FOR USE WITH A COMPUTER HARD DISC SYSTEM

FIELD OF THE INVENTION

This invention relates generally to memory storage systems having linear address spaces, and more specifically to mechanisms providing autonomous address mode translation between a host computer and a hard disc storage unit.

BACKGROUND OF THE INVENTION

Computers typically include a host central processing unit ("CPU") and a persistent storage device such as a hard disc drive storage unit. Typically the hard disc drive unit includes one or more discs, each having two storage surfaces whereon addressable tracks and storage sectors are defined. The collection of all tracks having the same track number on the various surfaces defines a storage cylinder. The hard disc drive unit includes a read/write head for accessing data to be stored or read from each disc storage surface.

A hard disc controller is coupled between the CPU and the hard disc to control the flow of data between the CPU and hard disc, and to control positioning of the hard disc read/write heads for accessing desired hard disc sectors. Data that the host CPU wants to store on the disc memory are first stored in a buffer memory within the controller. The controller then reads the buffer memory and writes the data to the hard disc at storage locations specified by the host CPU. Data that the host wants to retrieve from the disc memory are requested by the host CPU and retrieved from disc to the buffer memory by the disc controller. The data are then sent to the host by the disc controller via an interface.

The physical geometry of a hard disc surface refers to the disc drive configuration, including the number of tracks or cylinders, sectors per track, and heads. Due to limitations in some host system software, not all disc drive physical geometries are supported. Consequently, to promote compatibility with such host systems, the disc drive software often emulates a given physical geometry. Such emulated geometry is termed logical disc geometry to differentiate it from the physical or actual geometry of a disc drive.

Historically and continuing to the present, the host CPU specifies memory storage locations in terms of physical hard disc addresses, for example, by specifying hard disc cylinder, head and sector (collectively, "CHS") whereat desired data are to be found or stored. On the other hand, modern computer systems preferably use so-called virtual or logical addressing, wherein data are identified by a virtual or logical CHS address. The necessary physical-logical address conversions take place under control of a local microprocessor associated with the hard disc controller unit. Generally, to be competitive in the commercial market place, the local microprocessor is a relatively inexpensive, low performance component.

When the host CPU sends a command to the hard disc controller, task registers within the controller are written to and initialized, for example with respect to sector, head, transfer count, and mode information. The last action associated with this process is the writing of the actual command, e.g., a read command, to the command register within the task registers. Certain bits within the host CPU-issued command inform the hard disc controller what type of address is being given, e.g., physical CHS or virtual LBA. However, these command bits do not inform the controller as to what action should be taken.

As noted, the first few writes by the host CPU simply load information into the other task registers. The final write is to the command register, at which time the local microprocessor recognizes that this register has been written to. Upon recognition, which can result from polling or from an interrupt mechanism, the local microprocessor fetches the contents of all of the registers. The number of task registers depends upon the standard to which the hard disc controller conforms. For example, an AT Attachment (or "ATA") compatible controller may have six to ten task registers, whereas a small computer system interface ("SCSI") controller can have sixteen or more registers. Among the data written to these registers will be the address that must be converted by the local microprocessor, e.g., the address from which the host CPU wishes to read or write.

Thus, there will be a delay of perhaps 10 μs or more to recognize the interrupt or status of a polling routine that a host CPU command has been received. Next, the local microprocessor must read data from the various task registers. The local microprocessor must then perform various mathematical manipulations before even learning what conversion is needed, or where to go. Upon learning the address specified by the host CPU and decoding the required type of translation, the local microprocessor now commences mathematically translating the specified address into the required format.

To be economically competitive, hard disc controllers require that the local microprocessor be inexpensive, e.g., relatively unsophisticated in its capabilities. As a result, conversion between physical hard disc cylinder-head-sector ("CHS") addresses and virtual or logical addresses is a relatively time consuming process. In the prior art, after the local microprocessor recognizes that a command requiring address conversion has been received, conversion per se can require an additional 300 μs or so to complete.

In the past, the 0.3 ms address conversion time has not been especially significant because command overhead times associated with past generations of hard disc drives were relatively long, e.g., >10 ms. However, modern hard disc drives have command overhead times on the order of 1 ms or less, and often incorporate disc caching. As a result, the 0.3 ms address conversion time is no longer a negligible delay component. As used herein, the term "command overhead time" refers to the delay within a disc controller between receipt of the last word of a command, typically writing of the command register, and the time of actual execution of the desired command, at which time the host CPU recognizes the response to its issued command. Understandably, providing a more powerful local microprocessor could be useful in reducing command overhead time, but economic considerations have generally precluded such a solution.

Thus, there is a need for a mechanism to expedite address conversions between physical and logical address spaces. Further, to be commercially feasible, a mechanism for address conversion should be realizable with a minimum of hardware and/or software overhead.

The present invention discloses such a method and apparatus for converting between physical and virtual address spaces.

SUMMARY OF THE PRESENT INVENTION

A translator unit for autonomously translating between physical address spaces and logical address spaces decodes command bits present in the host CPU-issued command. Preferably using hardware implementation, the translator unit recognizes that a command requiring address translation has been issued (typically read or write), and recognizes that an address has been specified by the host CPU. The invention includes a preferably hardware-implemented algorithmic converter whose conversion modes include at least physical to logical address translation, and logical to physical address translation. The decoded command bits select the algorithm conversion mode to be used, and the algorithmic converter provides real-time address translation.

Translation preferably is accomplished autonomously using a state machine, without intervention of a hard disc controller local microprocessor, and can be completed within a few microseconds. Within the translator unit, indirect addressing is used whereby an address pointer is loaded before reading or writing to or from translator unit registers. This permits the translator unit to access such registers for reads and for writes. Physical-to-virtual address translation may be accomplished automatically by reading data from the host CPU task registers upon receipt of a command received signal, or by the local microprocessor writing to the command register. Thus, either the host CPU or the local microprocessor may write to the command register.

Other features and advantages of the invention will appear from the following description in which the preferred embodiments have been set forth in detail, in conjunction with the accompanying drawings.

DETAILED DESCRIPTION OF THE PREFERRED EMBODIMENT

The present invention may be used in any application wherein autonomous address translation is desired between linear address spaces. Such applications may include, without limitation, logical cylinder head sector ("CHS") to logical block address ("LBA"), or physical block address (PBA") to physical cylinder head sector ("CHS"). In the preferred embodiment, the present invention is used to convert between physical and virtual (or logical) storage space in a digital computer environment that includes a hard disc for persistent storage. Thus, while many application environments are possible, the present invention will now be described with respect to use with a digital computer system.

Figure 1:
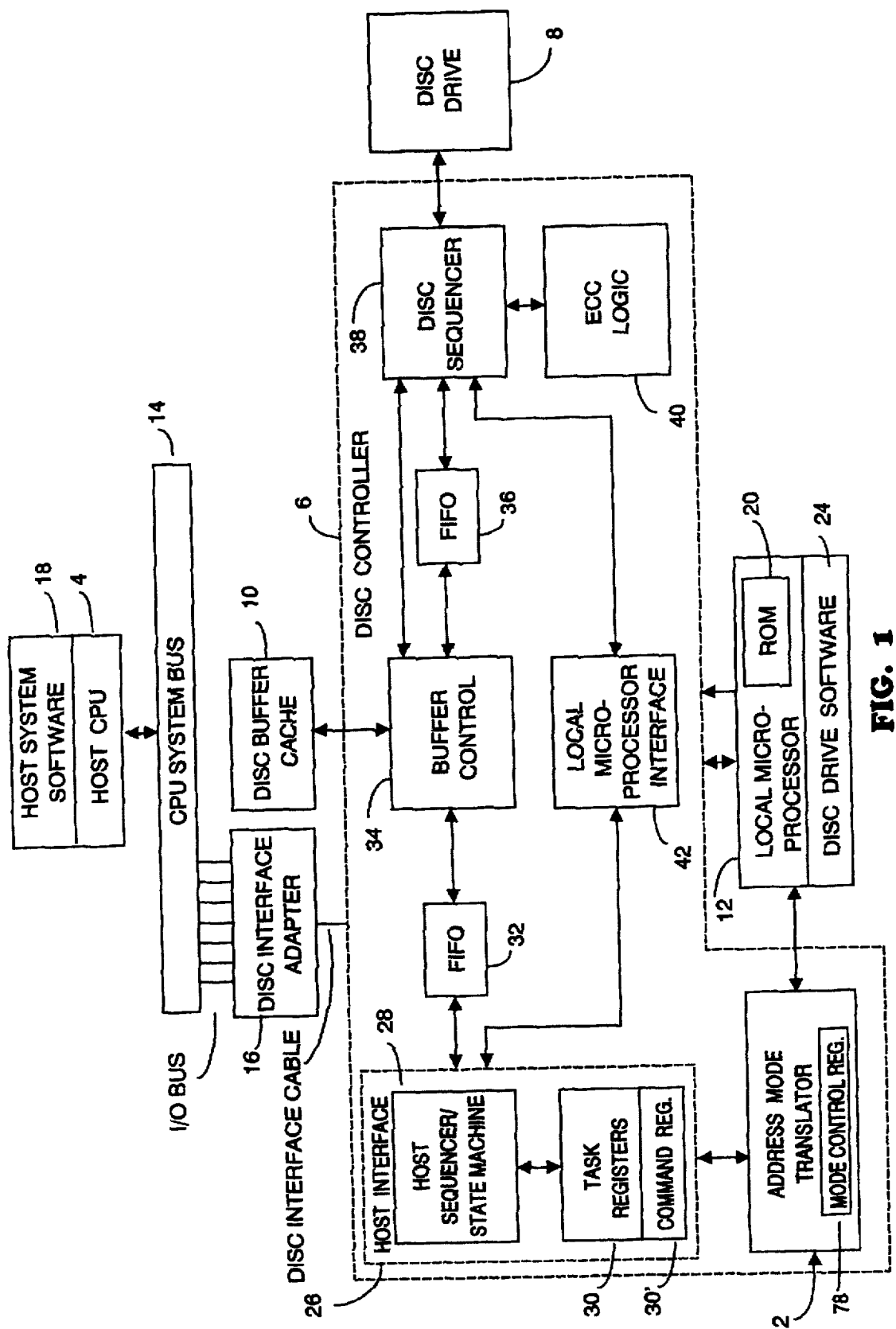
FIG. 1 depicts a computer system including an address mode translator, according to the present invention.

FIG. 1 depicts the present invention 2 as part of a computer system that typically includes a host CPU 4 that communicates with a hard disc controller unit 6 to read or write data to or from a hard disc drive 8. Associated with the disc controller unit are a disc buffer cache 10 (into and from which data to be read or written are temporarily stored to shorten access time) and a local microprocessor 12 or more accurately (since substantial arithmetic capability need not be present) a microcontroller 12, that controls unit 6. Preferably, address translator 2 is fabricated on a common integrated circuit chip containing the hard disc controller 6. Hard disc controller units are known in the art, and for that reason will not be described in detail herein.

Host CPU 4 executes system software 18, and communicates with the hard disc controller unit 6 through a CPU system bus 14, a disc interface adapter 16 that provides decode and electrical buffering, and a typically 40 to 50-conductor disc interface cable.

Disc controller unit 6 may be implemented in any number of ways, provided there is compliance with the industry-accepted AT Attachment ("ATA"), SCSI, or other interface standard. The host interface protocol defines the interface between a host processor (e.g., CPU 4) communicating over a host bus (e.g., bus 14) and a hard disc controller unit (e.g., unit 6).

Each interface standard includes definitions for a set of task registers, a standardized disc interface cable connector, and associated interface signals. The defined task register set includes a command register containing the command code being sent to the hard disc drive, a data register for transferring data blocks between the controller buffer and the host processor, registers concerned with the relevant disc drive address, sector and read/write head, and registers containing status information including error posting.

Typical interface protocols requires certain real-time CPU-controller interface functions to be performed by the controller unit 6. For example, an intersector handshake is required at each sector boundary on the hard disc, whereby the status of a previous sector must be posted before reading or writing from the next sector. Further, controller unit task file registers require updating to indicate the identity of the sector currently being transferred. Finally, all write data must be automatically receipted for. Because interface standards are widely known, further details will not be presented herein except as necessary for an understanding of applicants' address mode translator invention.

The system depicted in FIG. 1 is primarily a block-interface. Host CPU 4 requests a block of data to or from the controller unit 6 in terms of a physical cylinder-head-sector (CHS) address, but does not specify or control where or in what form that data shall be stored in buffer cache 10, or on the hard disc storage media 8. Typically, buffer cache 10 is implemented as dynamic random access memory ("DRAM").

As shown in FIG. 1, controller unit 6 includes a host interface unit 26 preferably comprising a microprocessor-controlled sequencer, or state-machine, 28 and a set of registers 30, including interface-compliant task registers. Unit 26 further includes a buffer control unit 34 that communicates with the interface unit 26 via a first-in first-out ("FIFO") buffer 32, that communicates with a hard disc sequencer 38 via a second first-in first-out ("FIFO") buffer 36, and that communicates with the disc buffer cache 10. Disc sequencer 38 transmits data between disc cache 10 (via buffer control 34) and disc drive 8.

Controller unit 6 also includes a local microprocessor interface 42 that communicates with the sequencer unit 28, and with a hard disc sequencer 38. The hard disc sequencer 38 is also coupled between FIFO 36 and the hard disc drive 8, and preferably also to an error correcting code ("ECC") logic unit 40 that corrects data read from the hard disc 8.

Within controller 6, data is stored in FIFO 36 before transmission to disc drive 8 (via the disc sequencer 38) or to buffer cache 10 (via buffer control 34). FIFO buffers 32 and 36 generally are each sized to hold less than a sector's worth of data. This advantageously permits data stored in FIFO 36 to be read out while data are being written into FIFO 32. Buffer control 34 addresses and provides buffer cache read/write timing signals and controls to the buffer cache 10.

The local microprocessor interface 42 provides read and write signals for the interface controller 26, decodes register addresses generated by the address mode translator 2 to be provided to select registers 30.

Commands from host processor 4 include command bits that identify what, if any, address mode translation must be made. These command bits are automatically copied into the mode control register 78 associated with the address mode translator branch logic 94 of the present invention 2 (see FIG. 3). Some host commands will not require address information, e.g., a read buffer command, or an identify disc drive command. Most commands, however, will require address information, which information is specified by the host CPU 4 in physical CHS address space.

Upon command from the host processor 4, data to or from memory associated with the host CPU are parallel transferred into the controller unit 6, through the interface unit 26, FIFO 32, and then into the disc buffer cache 10.

Upon receipt of a host CPU command, the controller unit local microprocessor 12 is interrupted, or the local microprocessor may simply be in a polling loop, continuously testing to see whether a host CPU command has been received. In either case, once an incoming command is recognized, local microprocessor 12 then reads task file registers (among registers 30) and decodes the command and command bits from the command register.

According to the present invention, an address mode translator 2 makes all necessary physical-to-logical (or virtual), or logical (or virtual)-to-physical address translations. As used herein, it is understood that CHS nomenclature denotes physical address space. Logical or virtual address space will be identified as logical block addresses ("LBA"). Applicants' algorithms implementing CHS→LBA or LBA→CHS translations (as well as straight multiplication and division operations) may be permanently stored in ROM 20 or may be downloaded from software 24 to RAM associated with the address mode translator 2.

In typical disc interface specifications, task file registers (among registers 30) within interface unit 26 must be updated during disc drive data transfer operations. As such, the host system software 18 must access the task file registers 30 to monitor data transfer and to associate errors reported by disc drive 8 with respect to particular sectors. It is understood that addresses associated with error reports from the ECC logic unit 40 must be converted by the address mode translator 2 from logical or virtual address to physical CHS address for use by the host CPU 4.

As will be described, the proper translation mode (e.g., logical-to-physical, or vice versa, multiplication or division) is autonomously determined by translator 2, based upon the decoded command bits. This determination is made without intervention of the local microprocessor 12, except that the local microprocessor initializes the address mode translator including the mode control register 78. Initialization of the present invention need typically occur only at time of power-on (see FIG. 2, step 48). As such, determining the proper conversion mode may be said to occur autonomously.

Thus, the task file registers will specify the logical hard disc address to be read/written by the host system 4, 16, and will reflect the logical disc address of the sector currently being transferred to or from the host system. Disc drive software 24 also accesses the task file registers as the local microprocessor 12 supervises the disc drive 8, as it executes the host system commands, and as it directs transfer of data to and from disc cache 10 and the storage media within disc drive 8.

Address mode translator 2 transforms addresses as required according to the contents in the task file registers. Among task registers 30 in interface unit 26 will be task file registers that preferably indicate the starting sector on a track to be written, that indicate how many sectors are to be transferred, that indicate the read/write disc drive head to be accessed, that indicate the high byte and the low byte of a physical cylinder number address, a command register that receives and stores host CPU-issued commands, and a status register indicating operating status of the disc drive.

The details of address mode translation according to the present invention will now be described further, with additional reference to FIG. 2, which shows the procedural sequence of events provided by the present invention, and with reference to FIG. 3, a block-level depiction of hardware used to implement the address mode translator.

Figure 2:
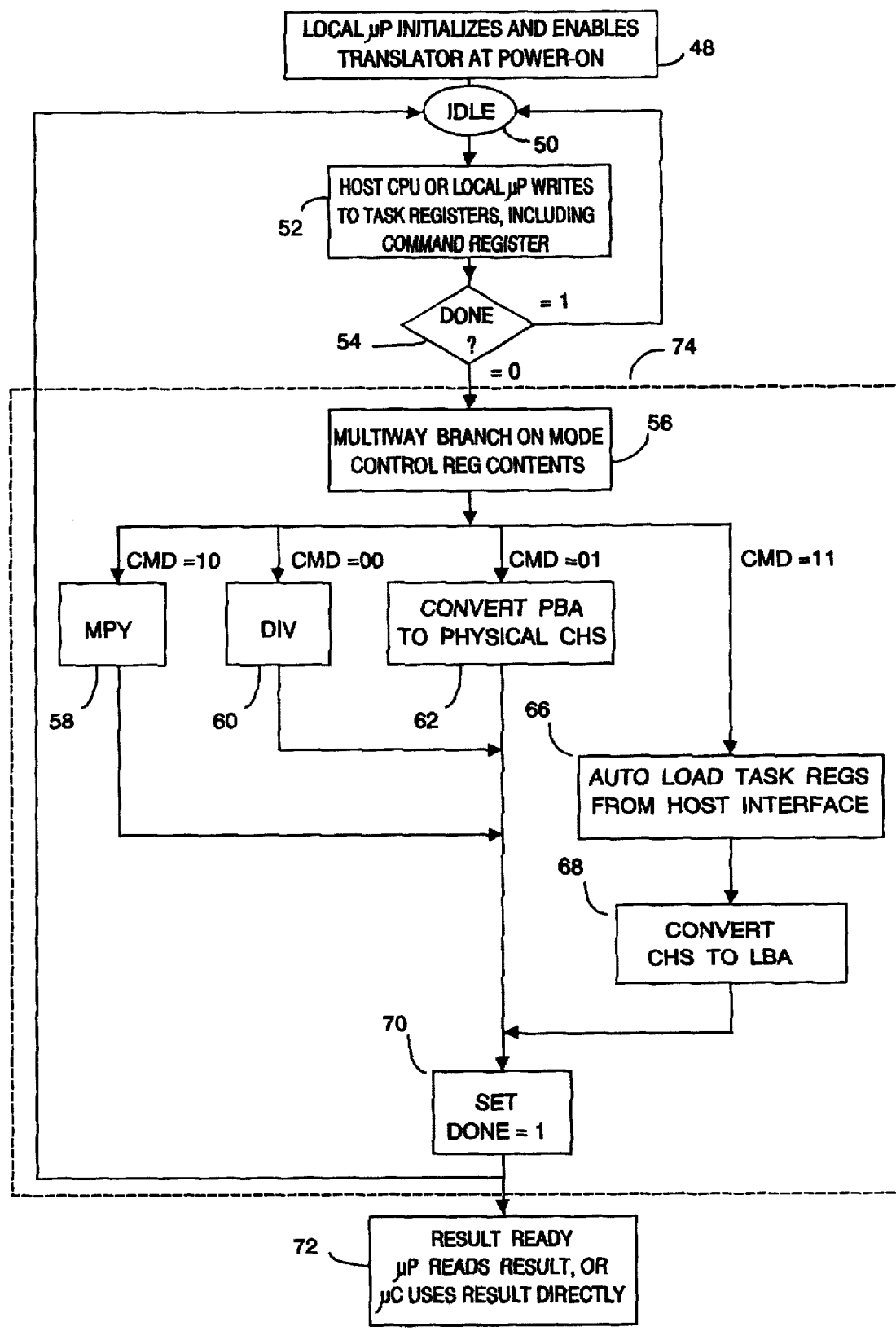
FIG. 2 is a flow diagram depicting address mode translation, according to the present invention.

In FIG. 2, at step 48, initialization of the address translator 2 occurs, typically during application of operating power to the system containing the present invention. Step 48 includes initializing the various registers within the address translator unit 2, including the mode control register 78. Following step 48, the address translator unit 2 is enabled.

As shown by step 50, the enabled translator unit will remain in an IDLE mode until polling or an interrupt signal that a host CPU-issued command has been received. Because polling and interrupt techniques are known in the art, details are not here presented.

At step 52, task registers 30, including the command register 30' are written to by the host CPU 4 or by the local microprocessor 12. Further, using indirect addressing the local microprocessor 12 will have written to mode control register 78.

As this juncture, the host CPU-issued command is fully loaded into the various task registers and interpretation of the command is undertaken. The present invention is initialized to the desired mode of address translation. At step 54, a DONE flag is automatically cleared (e.g., set DONE= "0") by action of the host CPU or by action of the local microprocessor or microcontroller 12 when the command register (see TABLE 3) is written. When DONE=0, the translator unit actively commences translation. Upon conclusion of translation, the address translator unit sets DONE=1 (see 70), which returns the translator unit to an idle state (step 50), pending a status change resulting from polling or an interrupt.

At method step 56, translation continues and any of four branches may be selected. Branch selection depends upon routine progresses to step 66. At step 66, task registers within register bank 30 in controller 6's interface unit 26 are automatically loaded, and at step 68, a CHS to LBA conversion occurs.

At step 70, the address translators sets the DONE flag=1 upon completion of either the multiplication operation (step 58), the division operation (step 60), the PBA to CHS conversion (step 62), or the CHS to LBA conversion (step 68). The local microprocessor must read the DONE register before a result is read out to ensure completion of the algorithm (step 72). (As noted at step 72 in FIG. 2, a microcontroller 12 could use the converted result directly.) The local microprocessor then sets DONE=1, which at step 50 returns the present invention to the idle mode. After conversion, the controller unit 6 performs all operations necessary to properly write the data to, or read the data from, the hard disc 8.

Figure 3:
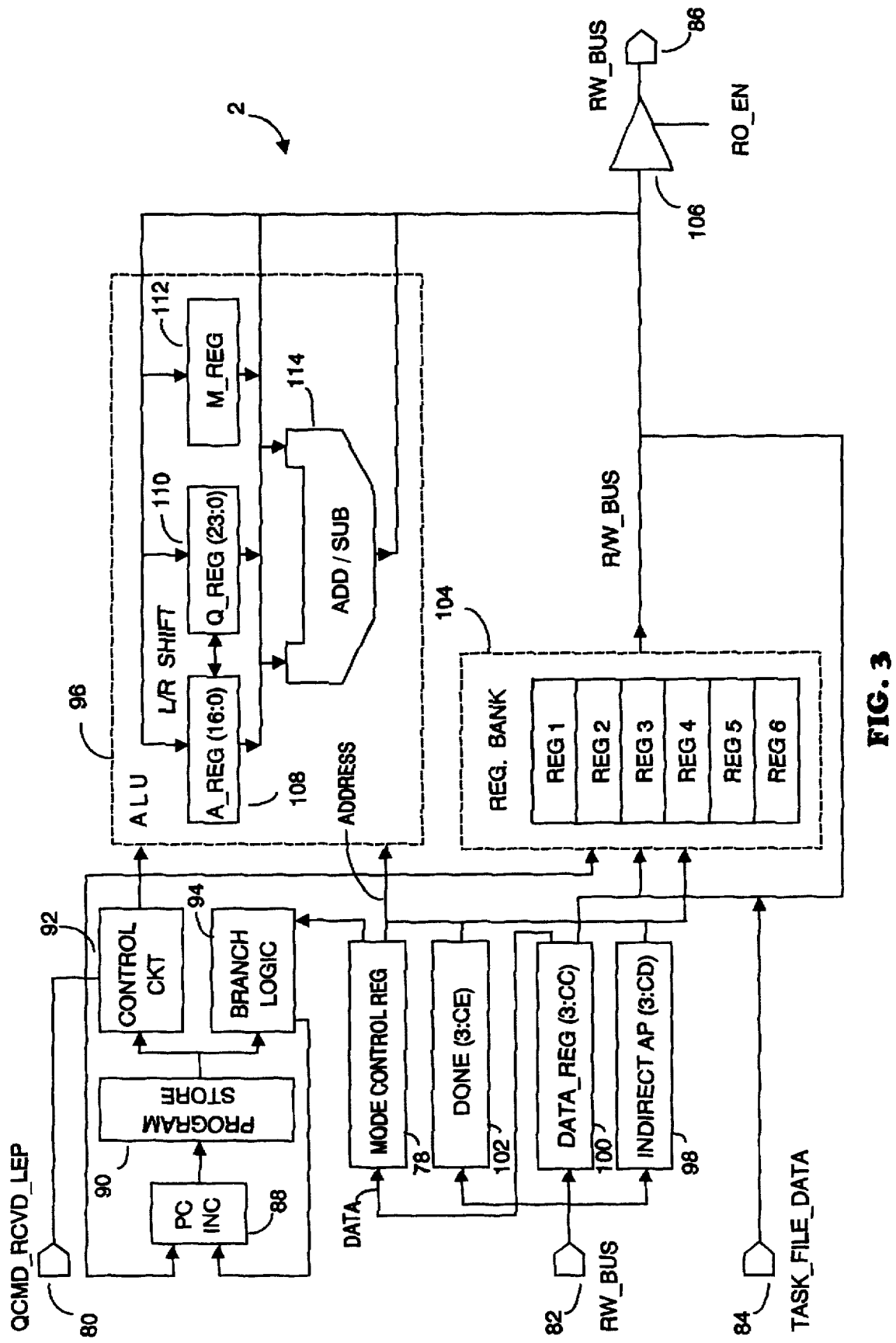
FIG. 3 is a block level diagram of an address mode translator, according to the present invention.

FIG. 3 is a simplified block level representation of the present invention 2, wherein interconnect paths are indicated generally. For ease of illustration, only the source and destinations required by the instruction set are shown coupled to the parallel data paths.

In FIG. 3, the address translator 2 receives three main inputs, Q_CMD_REVD_LEP 80, RW_BUS 82 from the local microprocessor 12, and TASK_FILE_DATA 84, which typically contains the host CPU-desired address in physical format. The data (e.g., product, quotient, converted address) processed by the address translator 2 is output on a RW_BUS line 86.

Also shown in FIG. 3 are a program counter incrementor 88, a program store 90 (which may store the algorithms implementing the address conversions), control circuit 92 the nature of the command issued by the host CPU 4, as decoded from the task file command register 30' and decoded by the mode control register 78. As shown by TABLE 4, command bits in mode control register 78 are used to indicate the translation function required.

As such, branching occurs autonomously without supervision from the local microprocessor 12, which in fact enters an interrupt state upon receipt of the host CPU-issued command. Autonomous branching at step 56 preferably is implemented as a sequencer process, the program for which is stored with, or downloaded by, the local microprocessor 12.

Preferably the command bits associated with the host CPU-issued command determine which algorithm within address translator 2 shall be selected and used. According to TABLE 4, by definition, if the command bits=10, a multiplication operation occurs at step 58. If the command bits=00, a division operation occurs at step 60. These two branches for commands 10, 00 are incidental to the main invention, but are provided because doing provides multiplication and division functions that may be advantageous for disc caching computations.

If the command bits=01, at step 62, a PBA to physical CHS conversion occurs. If the command bits=11, at step 64, a test is made to confirm that the command has been received. It is understood that the various bit patterns set forth herein preferably are binary encoded. Of course, other command bit formats and patterns could be used.

If step 64 does not confirm that the command has been received, the routine branches to the beginning of step 64. If, however, step 64 confirms command receipt, the and branch logic 94. In addition, the address translator 2 includes an ALU unit 96, a bank of registers 104, and preferably an enable/disable gate 106.

The address translator 2 further includes a number of directly addressed registers that receive information via RW_BUS line 82. These directly addressed registers include an indirect address pointer register INDIRECT AP (3:CD) 98, a register for data to be read or written DATA-REG (3:CC) 100, and a register that holds the DONE flag, DONE (3:CE) 102. FIG. 3 also depicts the mode control register 78.

The remaining address translator registers are accessed using an indirect addressing scheme that permits local microprocessor access for both reads and writes. An address pointer is loaded before reading or writing to or from these registers. More specifically, an indirect address pointer register is loaded with the starting address of the registers to be loaded, and self-increments for each read or write to location 3:CC. The indirect address decodes for the registers is as follows:

| register name | indirect address pointer | |
|---|---|---|
| COMMAND | $00 | |
| Q_REG0 | $01 (LSB's) | also loadable from host interface task registers 30 |
| Q_REG1 | $02 | also loadable from host interface task registers 30 |

-continued

| register name | indirect address pointer | |
|---|---|---|
| Q_REG2 | $03 (MSB's) | |
| M_REG | $04 | |
| REG1 | $05 | also loadable from host interface task registers 30 |
| REG2 | $06 | also loadable from host interface task registers 30 |
| REG3 | $07 | |
| REG4 | $08 | |
| REG5 | $09 | |
| REG6 | $0A | |
| A_REG0 | $0B (LSB's) | |
| A_REG1 | $0C (MSB's) | |

A brief description of these registers will now be given. The INDIRECT ADDRESS POINTER register (3:CDh) 98 may be loaded or read directly by the local microprocessor 12. The register preferably is four bits wide, to allow addressing of the 14 internal registers. To load registers, the starting address of the first register is loaded into the indirect address pointer. The pointer then increments itself after each write/read to sequentially load the remaining registers. Table 1 shows the contents for this four bit register 98.

TABLE 1

| BIT7 | BIT6 | BIT5 | BIT4 | BIT3 | BIT2 | BIT1 | BIT0 |
|---|---|---|---|---|---|---|---|
| 0 | 0 | 0 | 0 | IP3 | IP2 | IP1 | IP0 |

The INT_DATA_REG(3:CCh) register 100 is preferably 8 bits wide and may be directly loaded or read by the local microprocessor 12. This register contains data to be loaded at a location specified by the indirect address pointer (3:CDh). Table 2 shows the contents for this register 100.

TABLE 2

| BIT7 | BIT6 | BIT5 | BIT4 | BIT3 | BIT2 | BIT1 | BIT0 |
|---|---|---|---|---|---|---|---|
| DATA BITS | | | | | | | |

The DONE_REG (3:CEh) 102 is a one bit register that can be loaded or read directly by the local microprocessor 12. The one bit is set by the address translator once an algorithm is complete, which flags the DONE condition.

The local microprocessor must read this register before a result is read out, to guarantee algorithm completion. Further, the local microprocessor must clear this bit to start another algorithm. This DONE flag bit performs a handshake function between local microprocessor 12 and the address translator 2. Table 3 shows the location of the one flag bit for this register 102.

TABLE 3

| BIT7 | BIT6 | BIT5 | BIT4 | BIT3 | BIT2 | BIT1 | BIT0 |
|---|---|---|---|---|---|---|---|
| 0 | 0 | 0 | 0 | 0 | 0 | 0 | Done |

With reference to FIG. 3, mode control register 78 is a two bit register internal to the control circuitry 92, and may be read or written to by writing a 00h to the indirect address pointer (3:Cdh). This register decides which algorithm should be executed, e.g., multiply, divide, address conversions. The operative bits for this register are shown in Table 4.

TABLE 4

| BIT7 | BIT6 | BIT5 | BIT4 | BIT3 | BIT2 | BIT1 | BIT0 |
|------|------|------|------|------|------|------|------|
| 0 | 0 | 0 | 0 | 0 | 0 | COMM1 | COMM0 |

In Table 4, the four possible 0/1 combinations for bit 1 and bit 2 are interpreted as follows:

00→divide
01→PBA to physical CHS conversion
10→multiply
11→logical CHS to LBA conversion The remaining registers in FIG. 3 are used during arithmetic/logical operations, or to store results.

Thus, the bit 1 and bit 2 combination in the mode control register automatically dictates which algorithm shall be implemented by the address translator circuit of FIG. 3.

00→DIVIDE

Assume first that the operative command bits are 00, in which case a divide function is to be performed. The divisor is stored in the ALU M_REG 112, and the dividend stored in the ALU Q_REG 110. In the preferred embodiment, the values are always right-justified, and zeros are added to the most significant bit ("MSB") as necessary to completely load a register. In the preferred embodiment, the divisor is 8 bits long, and the dividend 23 bits long, with the restriction that the quotient be at most 16 bits long, with no overflow being allowed.

The results are stored in the following ALU 96 registers:

| Q_REG2 | remainder from divide |
| Q_REG1 | quotient from divide MSB |
| Q_REG0 | least significant bit ("LSB") |

01→PBA TO PHYSICAL CHS CONVERSION

The PBA to physical CHS conversion is accomplished using the following equations:

$$X/Y = t0 + r0$$

$$t0/Z = t1 + r1$$

$$t1 + W = r2$$

where,

| X = PBA | (loaded by local microprocessor to Q_REG) |
| Y = physical sectors/track | (loaded by local microprocessor to M_REG) |
| t0 = | integer quotient resulting from dividing X/Y |
| r0 = | remainder from dividing X/Y |
| Z = physical heads/drive | (loaded by local microprocessor to REG1) |
| t1 = | integer quotient from dividing t0/Z |
| r1 = | remainder resulting from dividing t0/Z |
| W = starting physical cylinder for the logical zone | (loaded by local microprocessor to LSBs of REG2) (loaded by local microprocessor to MSBs of REG3) |

In this particular embodiment, the loaded values are right justified, and zeroes are added as necessary to the MSB as necessary to completely load the registers.

The results are stored in the following locations:

| r0 | (stored in REG4) |
| r1 | (stored in REG1) |
| r2 | (stored in LSBs of REG2) (stored in MSBs of REG3) |

In the described embodiment, division restrictions include the divisor being 8 bits long, the dividend being bits, with the quotient being at most 16 bits long with no overflow allowed.

10→MULTIPLY

The multiplicand is stored in the ALU M_REG 112, and the multiplier is stored in the Q_REG 110, where these values are right justified, with zeroes added as necessary to the MSB to completely load a register.

The multiplication result is stored in the following registers:

| Q_REG0 | LSBS |
| Q_REG1 | |
| Q_REG2 | MSBS |

In the preferred implementation, the multiplier is 24 bits long, the multiplicand 8 bits, and a restriction is imposed that the multiplication product will be at most 24 bits long, with no overflow permitted.

11→LOGICAL CHS TO LBA CONVERSION

Logical CHS to LBA conversion is accomplished using the following equation:

$$LBA = ((((C*Nh)+H)*Ns)+S-1)$$

| where C is the logical cylinder | (loaded from the task register to Q_REG0 and Q_REG1) |
| H is the logical head | (loaded from task register 30 to REG3) |
| S is the logical sector | (loaded from task register 30 to REG1) |
| Nh is the logical heads/drive | (loaded once by local microprocessor to REG5) |
| Ns is the logical sectors/track | (loaded once by local microprocessor to REG6) |

In the preferred embodiment, the above values are right justified, with zeros added as necessary to the MSB to completely load the registers.

The result is stored in the following registers

| | |
|---|---|
| Q_REG0 | (LSBs) |
| Q_REG1 | |
| Q_REG2 | (MSBs) |

During multiplication, applicable restrictions include the multiplier being 24 bits long, the multiplicand being 8 bits, and the multiplication product being at most 24 bits long with no overflow permitted.

ADDRESS TRANSLATOR SEQUENCER COMMANDS:

The various address translator commands will now be more fully described. In the preferred implementation, each instruction is 8 bits wide, a "1" value in the MSB position represents a branch condition, and bits 6, 5 and 4 are the opcodes, as shown in Table 5.

TABLE 5

| 7 | 6 | 5 | 4 | 3 | 2 | 1 | 0 |
|---|---|---|---|---|---|---|---|
| Branch | Opcode 2 | Opcode 1 | Opcode 0 | BA3-/SF3 | BA2-/SF2 | BA1-/SF1 | BA0-/SF0 |

In Table 5, bits 3–0 act as a special field when branch=0, and act as a branch address when branch=1.

BR BRANCH_CONDITION:

TABLE 6

| 7 | 6 | 5 | 4 | 3 | 2 | 1 | 0 |
|---|---|---|---|---|---|---|---|
| 1 | cond2 | cond1 | cond0 | Branch Address | | | |

In Table 6, the condition is true, branch to the Branch Address preferably occurs, otherwise fallthrough to the next instruction occurs.

| Condition | Description |
|---|---|
| 000 | Br_Divide: Branches to the start of the branch address if command bits are 00. Resets the GP counter to 0. |
| 001 | Br_divide_algo: Branches to the start of the branch address if the command bits are 01. Resets the GP counter to 0. |
| 010 | Br_mult: Branches to the start of the branch address if the command bits are 10. GP Counter is reset to 0. |
| 011 | Br_mul_algo: This is an optimized instruction to best use of the sequencer map. A_reg0 and A_reg1 are both initialized to 0. If command bits are 11 and xtrnl_br_cond is a 1, the program counter is incremented by one, which leads to the mult_algorithm (CHS to LBA conversion). If command bits are not 11, then the branch goes to the address specified in the branch address section. The GP counter is reset to 0. |
| 101 | Br_not_count: This is an optimized instruction to best use the sequencer map. This branch causes the program counter to decrease by 2 (pc ← pc-2) for each branch. The number of times a branch takes place depends on bit2 of the command register. When bit2 = 1, the branch takes place un- |

| Condition | Description |
|---|---|
| 111 | til the GP counter reaches 24. When bit2=0, the branch takes place until the GP counter reaches a value of 15. Bit2 of the command register is always a 1 for multiply and is always a 0 for divide. Br_uncond: This is an unconditional branch to the address specified. The GP counter is reset to 0. |

LOAD:

TABLE 7

| 7 | 6 | 5 | 4 | 3 | 2 | 1 | 0 |
|---|---|---|---|---|---|---|---|
| 0 | 0 | 0 | 1 | SF3 | SF2 | SF1 | SF0 |

| Special field | Description |
|---|---|
| 0000 | ld_m_reg1: loads the contents of REG1 to M_REG |
| 0001 | ld_reg4_r0: loads the contents of Q_REG2 (which represents part of the result from divide) to REG4 |
| 0010 | ld_spec: Used during the divide algorithm (PBA to physical CHS translation). Once one divide is complete, Q_REG2, A_REG0(0) and the sign bit are cleared to start a new divide |
| 0011 | ld_req1_r1: loads the contents of Q_REG1. This is part of the result from the divide algorithm. |
| 0100 | ld_task_file: Used during the multiply algorithm (CHS to LBA translation). The address translator loads the data from the task register file when it receives the xtrnl_br_cond signal from the AT host. REG5 is loaded to M_REG and the GP counter is initialized. |
| 0101 | ld_m_reg6: loads the contents of REG6 to M_REG. The GP counter is initialized. |

SHIFT:

TABLE 8

| 7 | 6 | 5 | 4 | 3 | 2 | 1 | 0 |
|---|---|---|---|---|---|---|---|
| 0 | 0 | 1 | 0 | SF3 | SF2 | SF1 | SF0 |

| Special field | Description |
|---|---|
| 1000 | Shr_Inc: Used during multiply, A_REG and Q_REG are concatenated together and then shifted right one bit. The MSB of Q_REG is loaded with a 0, and the GP counter is incremented by 1. |
| 1110 | Shl_Inc: Used during divide, A_REG and Q_REG are concatenated and shifted left one bit. Depending on the |

ADD_SUB:

TABLE 9

| 7 | 6 | 5 | 4 | 3 | 2 | 1 | 0 |
|---|---|---|---|---|---|---|---|
| 0 | 0 | 1 | 1 | SF3 | SF2 | SF1 | SF0 |

| Special field | Description |
|---|---|
| 1000 | add_q_reg3: Q_REG is added to REG3, and the result loaded back to Q_REG. |
| 1001 | add_q_reg1: Q_REG is added to reg1 and the result loaded back to Q_REG. |
| 0010 | sub_sq_m: Used during divide, the sign bit is concatenated with q_reg and then subtracted from m_reg. The sign bit is updated with the MSB of the result, and Q_REG is updated with the result of the subtraction. |
| 1110 | add_reg23_q: REG2 and REG3 are concatenated and then added to Q_REG0 concatenated with Q_REG1. The most significant 8 bits of the result is loaded to REG3 and the least significant 8 bits to REG2. |

COND_ADD_SUB:

TABLE 10

| 7 | 6 | 5 | 4 | 3 | 2 | 1 | 0 |
|---|---|---|---|---|---|---|---|
| 0 | 1 | 0 | 1 | SF3 | SF2 | SF1 | SF0 |

| Special field | Description |
|---|---|
| 000 | Cond_add_am: M_REG is added to A_REG and the result loaded back to Q_REG if the LSB of Q_REG = 1. |
| 0001 | Cond_add_sub_sign: depending on the sign, bit aq(A_REG0(0) & Q_REG2) is either added or subtracted from M_REG. The MSB of this add/sub is used to update the sign bit. |

| Special field | Description |
|---|---|
| | sign bit, either a 0 or a 1 is loaded in the LSB position of Q_REG. GP Counter is incremented by 1. |

MISCELLANEOUS COMMANDS:

TABLE 11

| 7 | 6 | 5 | 4 | 3 | 2 | 1 | 0 |
|---|---|---|---|---|---|---|---|
| 0 | 1 | 0 | 0 | SF3 | SF2 | SF1 | SF0 |

| Special field | Description |
|---|---|
| 0001 | Remain_corr: This instruction is used to do remainder correction at the end of each divide. |

The sequencer map used by the address translator will now be described.

| Branch Address | Code | Instruction | Comments |
|---|---|---|---|
| start | 10001111 | br_divide | branch to divide |
| | 10011111 | br_divide algo. | branch to divide |
| | 10110100 | br_mult-algo. | branch to branch1 |
| | 00010100 | ld_task_file | |
| branch1 | 01010000 | cond_add_am | |
| | 00101000 | shr_lnc | |
| | 11010011 | br_not_cnt | branch to branch1 |
| | 10101110 | br_mult | end of multiply. branch to branch4 |
| | 00111000 | add_q_reg3 | |
| | 00010101 | ld_m_reg6 | |
| branch2 | 01010000 | cond_add_am | |
| | 00101000 | shr_lnc | |
| | 11011000 | br_not_cnt | branch to branch2 |
| | 00111001 | add_q_reg1 | |
| branch4 | 11110000 | br_uncond | end of multiply algorithm, branch to start |
| divide | 00110010 | sub_sq_m | |
| branch3 | 00101110 | shl_inc | |
| | 01010001 | cond_add_sub_sign | |
| | 11010000 | br_not_cnt | branch to branch3 |
| | 01000001 | remain_corr | |
| | 10001110 | br_divide | end of divide, branch to branch4 |
| | 00010001 | ld_reg4_r0 | |
| | 00010000 | ld_m_reg1 | |
| | 00010010 | ld_spec | |
| | 00110010 | sub_sq_m | |
| branch5 | 00101110 | shl_inc | |
| | 01010001 | cond_add_sub_sign | |
| | 11010000 | br_not_cnt | branch to branch5 |
| | 01000001 | remain_corr | |
| | 00010011 | ld_reg1_r1 | |
| | 00111110 | add_reg23_q | |
| | 11110000 | br_uncond | end of divide_algo. branch to start |

In summary, the present invention provides translation as well as multiplication and division functions, while allowing faster data transfer than if the local microprocessor had made necessary address translations. Using the preferred embodiment of the present invention, address translation takes only about 10 μs, as contrasted with perhaps 300 μs in the prior art. In fact, conversion is sufficiently fast that the address is properly converted by the time the complete command from the host CPU 4 is coupled to the interface unit 26.

However, exceedingly fast conversion is not the only advantage provided by the present invention. Applicants' translator unit is preferably implemented with hardware, using a simple microcontroller that costs about 20% of what a microprocessor would cost to perform the same translation tasks. (However, the more expensive microprocessor would still translate more slowly than the present invention.)

Further, the address translator passes an address to the local microprocessor in a form more readily usable by the microprocessor than had the microprocessor itself performed the same translation. Further, it will be appreciated that applicants' address translator can also automatically read data off the disc interface task registers 30 when a "command received" signal is generated by the host CPU, by writing to the command register (a feature used during a CHS to LBA translation).

In other embodiments, the translated address could be used directly to perform a cache look-up and transfer to the host CPU without local microprocessor intervention. It will be appreciated that on a cache hit, this could significantly decrease response times. In yet another embodiment, a zone look-up table could be included to initiate looking for requested data immediately, current with providing the translated address to the local microprocessor. If the requested data had not been remapped to a new location by defect management, the data may be found sooner if it is on the current track, and the local microprocessor were freed from configuring the hard disc controller to search for this data.

Modifications and variations may be made to the disclosed embodiments without departing from the subject and spirit of the invention as defined by the following claims. What is claimed is:

1. A translator unit for autonomously translating between linear address spaces, wherein said address spaces are associated with a hard disc storage unit, addressable in terms of cylinder, head, and sector numbers, or a sequential logical block address is used to store data for use by a host central processor unit (CPU), comprising:

a decoder for decoding bits present in commands issued by said host computer CPU, wherein different combinations of decoded said bits are associated with different modes of address translation;

an algorithmic function generator for providing a set of real-time translation functions including at least (a) logical block address to logical cylinder-head-sector address mode conversion, and (b) physical cylinder-head-sector address to physical block address mode conversion;

a mode selector, coupled to send algorithmic function generator, for selecting a chosen one from said set of translation functions in response to the decoded said bits;

wherein said algorithmic function generator translates address space associated with said commands in response to the decoded said bits;

said generator using an equation given by:

$$X/Y=t0+r0$$
   $$t0/Z=t1+r1$$
   $$t1+W=r2$$

where X is said block address, Y is a physical sector and track number, t0 is an integer quotient resulting from dividing X/Y, r0 is a remainder resulting from dividing X/Y, Z is a head drive number, t1 is an integer quotient resulting from dividing t0/Z, r1 is a remainder resulting from dividing t0/Z, and W is a number denoting a starting cylinder for a logical zone.

2. The translator unit of claim 1, wherein said address spaces are associated with a hard disc controller unit buffer.

3. The translator unit of claim 1, wherein said algorithmic function means translates said address space using hardware selected from the group consisting of (a) a state machine, (b) a microcontroller, and (c) a local microprocessor associated with said translator unit.

4. The translator unit of claim 1, wherein said algorithmic function means further provides at least one additional function selected from the group consisting of (c) division, and (d) multiplication.

5. A translator unit for autonomously translating between linear address spaces, wherein said address spaces are associated with a hard disc storage unit, addressable in terms of cylinder, head and sector numbers, or a sequential logical block address used to store data for use by a host central processor unit (CPU), comprising:

a decoder for decoding bits present in commands issued by said host computer CPU, wherein different combinations of decoded said bits are associated with different modes of address translation;

an algorithmic function generator for providing a set of real-time translation functions including at least (a) logical block address to logical cylinder-head-sector address mode conversion, and (b) physical cylinder-head-sector address to physical block address mode conversion;

a mode selector coupled to said algorithmic function generator, for selecting a chosen one from said set of translation functions in response to the decoded said bits;

wherein said algorithmic function generator translates address space associated with said commands in response to the decoded said bits;

said generator using an equation given by:

$$X/Y=t0+r0$$
   $$t0/Z=t1+r1$$
   $$t1+W=r2$$

where X is said block address, Y is a physical sector and track number, t0 is an integer quotient resulting from dividing X/Y, r0 is a remainder resulting from dividing X/Y, Z is a head and drive number, t1 is an integer quotient resulting from dividing t0/Z, r1 is a remainder resulting from dividing t0/Z, and W is a number denoting a starting cylinder for a logical zone;

said algorithmic function generator translating a cylinder-head-sector address to a block address using an equation given by:

$$\text{block address}=((((C*Nh)+H)*Ns)+S-1)$$

where C is a head number, Nh is a head and drive number, H is a head number, Ns is a sector and track number, and S is a sector number.

6. A translator unit for autonomously translating between linear address spaces wherein said address spaces are associated with a hard disc storage unit addressable in terms of cylinder, head, and sector numbers, or a sequential logical block address used to store data for use by a host central processor unit (CPU), comprising:

a decoder for decoding bits present in commands issued by said host computer CPU, wherein different combinations of decoded said bits are associated with different modes of address translation;

an algorithmic function generator for providing a set of real-time translation functions including at least (a) logical block address to logical cylinder-head-sector address mode conversion, and (b) physical cylinder-head-sector address to physical block address mode conversion;

a mode selector, coupled to said algorithmic function generator for selecting a chosen one from said set of translation functions in response to the decoded said bits;

wherein said algorithmic function generator translates address space associated with said commands in response to the decoded said bits;

said generator using an equation given by:

$$X/Y = t0 + r0$$

$$t0/Z = t1 + r1$$

$$t1 + W = r2$$

where X is said block address, Y is a physical sector and track number, t0 is an integer quotient resulting from dividing X/Y, r0 is a remainder resulting from dividing X/Y, Z is a head and drive number, t1 is an integer quotient resulting from dividing t0/Z, r1 is a remainder resulting from dividing t0/Z, and W is a number denoting a starting cylinder for a logical zone;

means for testing whether the host CPU has written a command;

a DONE register for testing whether said translator unit is presently available for translation;

means for branching, in response to an output from said means for decoding, to a portion of said algorithmic function generator providing a real-time translation function corresponding to an output of said decoder;

means for confirming that a host CPU command has been received, and if affirmative, means for reading task registers associated with said host CPU;

wherein if said decoder determines that a multiplication function is required, said algorithmic function generator provides a multiplication function;

wherein if said decoder determines that a division function is required, said algorithmic function generator provides a division function;

wherein if said decoder determines that a said block address is to be converted to a cylinder-head-sector address said algorithmic function generator uses an equation given by:

$$X/Y = t0 + r0$$

$$t0/Z = t1 + r1$$

$$t1 + W = r2$$

where X is said block address, Y is a sector and track number, t0 is an integer quotient resulting from dividing X/Y, r0 is a remainder resulting from dividing X/Y, Z is a head and drive number, t1 is an integer quotient resulting from dividing t0/Z, r1 is a remainder resulting from dividing t0/Z, and W is a number denoting a starting cylinder for a logical zone;

wherein if said decoder determines that a said cylinder-head-sector address is to be converted to a block address, said translator unit confirms receipt of said host CPU command and reads said task registers associated with said host CPU, and converts said address using an equation given by:

$$\text{block address} = ((((C*Nh)+H)*Ns)+S-1)$$

where C is a head number, Nh is a head and drive number, H is a head number, Ns is a sector and track number, and S is a sector number; and means for setting said DONE register means upon translation completion.

7. A method for autonomously translating between linear address spaces wherein said address spaces are associated with a hard disc storage unit, addressable in terms of cylinder, head, and sector numbers, used to store data for use by a host central processor unit (CPU), the method comprising the following steps:

decoding bits present in commands issued by said host computer CPU, wherein different combinations of decoded said bits are associated with different modes of address translation;

providing a set of real-time translation functions including at least (a) logical block address to logical cylinder-head-sector address mode conversion, and (b) physical cylinder-head-sector address to physical block address mode conversion;

selecting, in response to decoded said bits, a chosen one from said set of translation functions;

wherein said algorithmic function means translates address space associated with said commands in response to the decoded said bits;

wherein the step of providing translates a block address to a cylinder-head-sector address using an equation given by:

$$X/Y = t0 + r0$$

$$t0/Z = t1 + r1$$

$$t1 + W = r2$$

where X is said block address, Y is at sector and track number, t0 is an integer quotient resulting from dividing X/Y, r0 is a remainder resulting from dividing X/Y, Z is a head and drive number, t1 is an integer quotient resulting from dividing t0/Z, r1 is a remainder resulting from dividing t0/Z, and W is a number denoting a starting cylinder for a logical zone.

8. The method of claim 7 wherein said address spaces are associated with a hard disc controller unit buffer.

9. The method of claim 7, wherein the step of providing translates said address space using hardware selected from a group consisting of (a) a state machine, (b) a microcontroller, and (c) a local microprocessor associated with said translator unit.

10. The method of claim 7, wherein the step of providing further provides at least one additional function selected from a group consisting of (c) division, and (d) multiplication.

11. A method for autonomously translating between linear address spaces wherein said address spaces are associated with a hard disc storage unit addressable in terms of cylinder, head, and sector numbers, used to store data for use by a host central processor unit (CPU) the method comprising the following steps:

decoding bits present in commands issued by said host computer CPU wherein different combinations of decoded said bits are associated with different modes of address translation;

providing a set of real-time translation functions including at least (a) logical block address to logical cylinder-head-sector address mode conversion and (b) physical cylinder-head-sector address to physical block address mode conversion;

selecting, in response to decoded said bits, a chosen one from said set of translation functions:

wherein said algorithmic function means translates address space associated with said commands in response to the decoded said bits:

wherein the step of providing translates a block address to a cylinder-head-sector address using an equation given by:

$$X/Y=t0+r0$$

$$t0/Z=t1+r1$$

$$t1+W=r2$$

where X is said block address Y is a sector and track number, t0 is an integer quotient resulting from dividing X/Y, r0 is a remainder resulting from dividing X/Y, Z is a head and drive number, t1 is an integer quotient resulting from dividing t0/Z, r1 is a remainder resulting from dividing t0/Z, and W is a number denoting a starting cylinder for a logical zone;

wherein the step of providing translates a cylinder-head-sector address to a block address using an equation given by:

$$\text{block address}=((((C*Nh)+H)*Ns)+S-1)$$

where C is a head number, Nh is a head and drive number, H is a head number, Ns is a sector and track number, and S is a sector number.

12. A method for autonomously translating between linear address spaces wherein said address spaces are associated with a hard disc storage unit addressable in terms of cylinder, head, and sector numbers used to store data for use by a host central processor unit (CPU), the method comprising the following steps:

decoding bits present in commends issued by said host computer CPU, wherein different combinations of decoded said bits are associated with different modes of address translation:

providing a set of real-time translation fractions including at least (a) logical block address to logical cylinder-head-sector address mode conversion, and (b) physical cylinder-head-sector address to physical block address mode conversion;

selecting in response to decoded said bits, a chosen one from said set of translation functions;

wherein said algorithmic function means translates address space associated with said commands in response to the decoded said bits:

wherein the step of providing translates a block address to a cylinder-head-sector address using an equation given by:

$$X/Y=t0+r0$$

$$t0/Z=t1+r1$$

$$t1+W=r2$$

where X is said block address, Y is a sector and track number, t0 is an integer quotient resulting from dividing X/Y, r0 is a remainder resulting from dividing X/Y, Z is a head and drive number, t1 is an integer quotient resulting from dividing t0/Z, r1 is a remainder resulting from dividing t0/Z, and W is a number denoting a starting cylinder for a logical zone;

including additional steps of:

testing whether the host CPU has written a command;

providing DONE register means for testing whether said translator unit is presently available for translation;

branching, in response to an output determined by the step of decoding, a chosen one of said set of real-time translation functions;

confirming that a host CPU command has been received, and if affirmative, reading task registers associated with said host CPU;

wherein if the step of decoding determines that a multiplication function is required, branching to provide a said multiplication function;

wherein if the step of decoding determines that a division function is required, branching to provide a said division function;

wherein if the step of decoding determines that a block address is to be converted to a cylinder-head-sector address, branching to provide a block to address conversion;

wherein if the decoding step determines that a cylinder-head-sector address is to be converted to a block address, confirming receipt of said host CPU command, reading said task registers associated with said host CPU, and branching to provide a block address conversion; and setting said DONE register upon translation completion.

13. The method of claim 12, wherein a said address conversion is carried out using an equation given by:

$$X/Y=t0+r0$$

$$t0/Z=t1+r1$$

$$t1+W=r2$$

where X is said block address, Y is a sector and track number, t0 is an integer quotient resulting from dividing X/Y, t0 is a remainder resulting from dividing X/Y, Z is a head and drive number, t1 is an integer quotient resulting from dividing t0/Z, r1 is a remainder resulting from dividing t0/Z, and W is a number denoting a starting cylinder for a zone.

14. The method of claim 12, wherein a said block address conversion is carried out using an equation given by;

$$\text{block address}=((((C*Nh)+H)*Ns)+S-1)$$

where C is a head number, Nh is a head and drive number, H is a head number, Ns is a sector and track number, and S is a sector number.

* * * * *